(12) United States Patent
Zhu

(10) Patent No.: US 10,019,075 B2
(45) Date of Patent: Jul. 10, 2018

(54) CONTROL INPUT APPARATUS

(71) Applicant: Chunsheng Zhu, Beijing (CN)

(72) Inventor: Chunsheng Zhu, Beijing (CN)

(*) Notice: Subject to any disclaimer, the term of this patent is extended or adjusted under 35 U.S.C. 154(b) by 103 days.

(21) Appl. No.: 15/031,592

(22) PCT Filed: Oct. 24, 2013

(86) PCT No.: PCT/CN2013/085911
§ 371 (c)(1),
(2) Date: Jun. 30, 2016

(87) PCT Pub. No.: WO2015/058390
PCT Pub. Date: Apr. 30, 2015

(65) Prior Publication Data
US 2016/0306440 A1   Oct. 20, 2016

(51) Int. Cl.
*G06F 3/0346* (2013.01)
(52) U.S. Cl.
CPC ................ *G06F 3/0346* (2013.01)
(58) Field of Classification Search
CPC ...... G06F 3/0346; G06F 3/016; G06F 3/0414; G06F 3/011; G06F 1/1694; G06F 3/0338
See application file for complete search history.

(56) References Cited

U.S. PATENT DOCUMENTS

| | | | | |
|---|---|---|---|---|
| 6,597,347 B1 * | 7/2003 | Yasutake | ............... | G06F 3/0338 178/18.01 |
| 6,891,527 B1 * | 5/2005 | Chapman | ............... | G06F 3/0346 345/158 |

(Continued)

FOREIGN PATENT DOCUMENTS

| | | |
|---|---|---|
| CN | 103218070 A | 2/2013 |
| CN | 103218070 | 3/2016 |

(Continued)

OTHER PUBLICATIONS

Office Action issued by the Japanese Patent Office dated Feb. 14, 2017 for 2016-549604.

(Continued)

*Primary Examiner* — Jose Soto Lopez
(74) *Attorney, Agent, or Firm* — SmithAmundsen LLC; Douglas G. Gallagher; Kevin C. Oschman

(57) ABSTRACT

The disclosure relates to a hand control input device, comprising a housing, wherein the housing is internally provided with an interface chip for communicating with a terminal equipment. The housing is further internally provided with: a first z-axis signal collector for generating a first z-axis signal containing a first pressure value and a first identifier; a second z-axis signal collector for generating a second z-axis signal containing a second pressure value and a second identifier; a z-axis signal processor, connected with the first z-axis signal collector, the second z-axis signal collector, and the interface chip for extracting the first pressure value from the first z-axis signal and the second pressure value from the second z-axis signal, calculating, according to the first pressure value, the second pressure value and the sampling period, a z-axis displacement variation value for controlling a displacement variation of a controlled object in an interface space of the terminal equipment in a positive direction and negative direction of z-axis, and transmitting the z-axis displacement variation value via the interface chip. The hand control input device can realize the displacement control of the controlled object along the direction of the z-axis.

18 Claims, 5 Drawing Sheets

(56) References Cited

U.S. PATENT DOCUMENTS

| | | | | |
|---|---|---|---|---|
| 2011/0254813 A1* | 10/2011 | Mode | G06F 3/0317 | 345/179 |
| 2011/0267294 A1* | 11/2011 | Kildal | G06F 3/016 | 345/173 |
| 2011/0267316 A1* | 11/2011 | Kim | G06F 1/1639 | 345/175 |
| 2012/0011932 A1* | 1/2012 | Nakagawa | G06F 3/0346 | 73/379.02 |
| 2012/0154267 A1* | 6/2012 | Albano | G06F 3/0346 | 345/156 |
| 2012/0256739 A1* | 10/2012 | Kawabe | B25J 13/025 | 340/407.2 |
| 2012/0260220 A1* | 10/2012 | Griffin | G06F 3/033 | 715/863 |
| 2013/0027294 A1* | 1/2013 | Nakagawa | G06F 3/0338 | 345/156 |
| 2013/0027295 A1* | 1/2013 | Kuriya | G06F 3/0346 | 345/156 |
| 2013/0027299 A1* | 1/2013 | Tsukahara | G06F 1/1694 | 345/157 |
| 2014/0111415 A1* | 4/2014 | Gargi | G06F 3/017 | 345/156 |
| 2014/0130608 A1* | 5/2014 | Adams | G06F 3/0346 | 73/861.66 |
| 2014/0139454 A1* | 5/2014 | Mistry | G06F 3/041 | 345/173 |
| 2014/0165770 A1* | 6/2014 | Abri | G06F 3/016 | 74/490.01 |
| 2014/0317722 A1* | 10/2014 | Tartz | G06F 3/011 | 726/19 |
| 2015/0042563 A1* | 2/2015 | Tsukahara | G06F 3/0346 | 345/157 |
| 2015/0054633 A1* | 2/2015 | Saddik | G06F 3/016 | 340/407.1 |
| 2017/0168711 A1* | 6/2017 | Temple | G06F 3/0233 | |
| 2017/0228028 A1* | 8/2017 | Nakamura | G06F 3/017 | |

FOREIGN PATENT DOCUMENTS

| | | |
|---|---|---|
| JP | S60-214036 A | 10/1985 |
| JP | H05-040557 A | 2/1993 |
| JP | 2008-113719 A | 5/2008 |

OTHER PUBLICATIONS

English Abstract of JPS60-214036A (unofficial).
English Abstract of JP2008-113719A (unofficial).
English Abstract of CN103218070A (unofficial).
English Abstract of JPH05-040557A (unofficial).

* cited by examiner

CONTROL INPUT APPARATUS

TECHNICAL FIELD

The present disclosure relates to a peripheral equipment of a terminal equipment, and more particularly, to a hand control input device.

BACKGROUND

Since the launching, the computer has undergone a great many of technical innovations. For instance, computer's operation and control interface goes through the development from a command user interface to a graphical interface, then to a hot 3D interface by this time, which is dramatically changed. The 3D interface can be likely to present the requirements of the user in a direct way as far as possible, bringing about favorable experience effects for the user.

By contrast, for instance, the development of the computer input equipment including the mouse and the like cannot meet the requirement of the computer interface operation although people always improve the operation mode of the external equipment and perfect the user experiences. Over the years, signal generated by either mechanical mouse, photoelectric mouse or various mice related to the human engineering or other remote control equipment can only reflect the displacement variation of the mouse on the plane. In other words, the generated signal is scalar quantity rather than vector. Moreover, the operation mode is always subject to point-mode control. The operation is only performed by the motion of the input equipment, which is monotonous and has single function.

Moreover, in some scenes, such as 3D game, 3D model building operation and the like, the interface needs to be subject to the all-around control of two dimensions and three dimensions. As a result, the traditional mice only controlling the vertical and horizontal displacement of the controlled object are unable to meet this requirement obviously.

SUMMARY

Technical Problem

In this connection, the technical problem to be solved in the present disclosure is how to control the movement of the controlled object in the interface space of the terminal equipment along the direction of the z-axis.

Solution

In order to solve foregoing technical problems, the embodiment of the present disclosure provides a hand control input device, comprising: a housing, and an interface chip arranged inside the housing for communicating with a terminal equipment, wherein the hand control input device further comprises: a first z-axis signal collector arranged inside the housing for sensing a first force and generating a first z-axis signal, the first z-axis signal containing a first pressure value indicating a magnitude of the first force and a first identifier identifying the first z-axis signal collector; a second z-axis signal collector arranged inside the housing for sensing a second force and generating a second z-axis signal, the second z-axis signal containing a second pressure value indicating a magnitude of the second force and a second identifier identifying the second z-axis signal collector; and a z-axis signal processor, arranged inside the housing and connected with the first z-axis signal collector, the second z-axis signal collector, and the interface chip, the z-axis signal processor being adapted to extract the first pressure value from the received first z-axis signal, extract the second pressure value from the received second z-axis signal, calculate, according to the first pressure value, the second pressure value, and a sampling period, a z-axis displacement variation value for controlling a displacement variation of a controlled object in an interface space of the terminal equipment in a direction of z-axis, and transmit the z-axis displacement variation value to the terminal equipment via the interface chip, and the direction of the z-axis is a perpendicular direction of the controlled object in the interface space.

Advantageous Effects

The hand control input device of the disclosure can not only realize the traditional two-dimensional control function, but also can realize the three-dimensional control of the controlled object. Particularly, for the 3D controlled object, the control for the 3D controlled object along the direction of the z-axis in the interface space can be realized so as to realize all-around control of two dimensions and three dimensions on the controlled object.

The other features and aspects of the present disclosure will become more apparent from the following detailed description for the exemplary embodiments when taken with reference to the accompanying drawings.

BRIEF DESCRIPTION OF THE DRAWINGS

The drawings contained in the specification and formed as a part thereof, show the example embodiments, features and aspects of the present disclosure with the specification together for explaining the theory therein.

REFERENCE LIST

Figure 1:
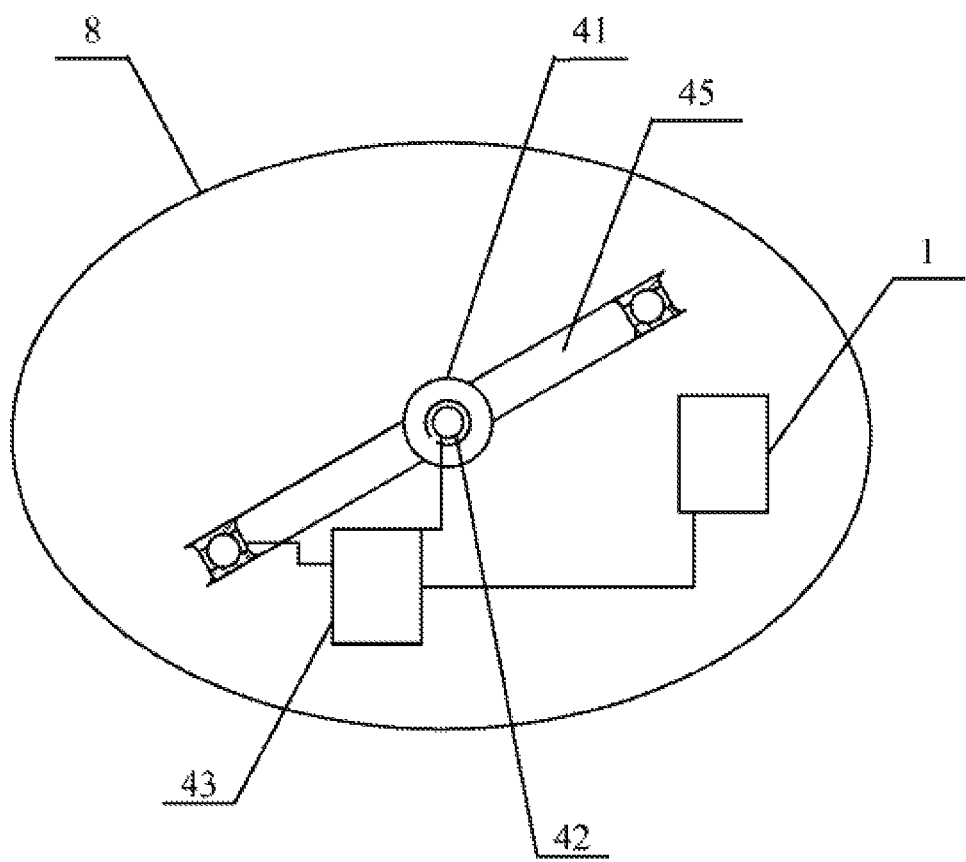
FIG. 1 is a structural diagram of a hand control input device provided by a first embodiment of the present disclosure.

1: interface chip; 21: primary track device; 22: auxiliary track device; 23: track signal processor; 31: rotation signal collector; 32: rotation signal processor; 41: first z-axis signal collector; 42: second z-axis signal collector; 43: z-axis signal processor; 45: connecting rod; 51: left touch pressure signal collector; 52: right touch pressure signal collector; 53: touch pressure signal processor; 8: housing.

DETAILED DESCRIPTION

Various exemplary embodiments, features and aspects of the present disclosure will be described in details with reference to the drawings hereinafter. The same reference in the drawing indicates the element with the same or similar function. Unless otherwise stated specially, the drawing is unlikely to be drawn in spite of showing various aspects of the embodiment in the drawing.

The dedicated term "exemplary" here means "served as an example, embodiment or illustration". Any embodiment illustrated as "exemplary" here is unlikely to be explained to be superior to or better than the other embodiments.

In addition, more concrete details are given in the description of the preferred embodiments hereinafter in order to better illustrate the present disclosure. Those skilled in the art should understand that the present disclosure may be implemented as well even if there are no some concrete details. In other some examples, the methods, means, elements and circuits well known by those skilled in the art are not described in details, thereby standing out the aim of the present disclosure.

First Embodiment

As shown in FIG. 1, a hand control input device provided by one embodiment of the present disclosure comprises a first z-axis signal collector 41, a second z-axis signal collector 42, a z-axis signal processor 43, an interface chip 1, and a housing 8.

Wherein the housing 8 is an outer housing of the whole hand control input device, accommodating other parts in the hand control input device. The housing 8 in the embodiment is hemispherical, of course, it can also be designed to a shape suitable for human palm to operate according to human mechanics. The interface chip 1 is used for communication with a terminal equipment. The first z-axis signal collector 41 and the second z-axis signal collector 42 are electrically connected with the z-axis signal processor 43 respectively, and the z-axis signal processor 43 is electrically connected with the interface chip 1. Preferably, the first z-axis signal collector 41 and the second z-axis signal collector 42 of the embodiment are pressure sensors.

The first z-axis signal collector 41 can be arranged inside the housing 8 in multiple ways. For example, the first z-axis signal collector 41 is arranged inside the housing 8 via a connecting rod 45. Both ends of the connecting rod 45 are abutted against the two opposite ends of the housing 8, which is convenient for two fingers of a user to squeeze or contact and press along the opposite directions. Moreover, both ends of the connecting rod 45 can also be abutted against any other two ends of the housing 8 according to the use habit of the user. The first z-axis signal collector 41 is arranged at any position of the connecting rod 45; preferably, the first z-axis signal collector 41 is arranged in the middle of the connecting rod 45 in FIG. 1. The first z-axis signal collector 41 can also be either arranged at any position inside the housing 8 in other ways or only connected to one end of the housing 8. The first z-axis signal collector 41 is used for sensing the force applied to both ends of the connecting rod 45, and then generating a pressure signal containing a pressure value $F_1$ of the force and a identifier +1 of the first z-axis signal collector 41, and transmitting the pressure signal to the z-axis signal processor 43.

The second z-axis signal collector 42 can be arranged inside the housing 8 in multiple ways, such as arranged at the top inside the housing 8 for sensing the downward force to the housing 8 by the user, and then generating a pressure signal containing a pressure value $F_2$ of the force and a identifier −1 of the second z-axis signal collector 42, and transmitting the pressure signal to the z-axis signal processor 43.

Both the first z-axis signal collector 41 and the second z-axis signal collector 42 can be located at any position of the housing 8, being adapted to indicate the displacement variation of the controlled object along the direction of the z-axis in the interface space via the sensed force applied by the user.

In the embodiment, the displacement variation of the controlled object in the interface space of the terminal equipment along the positive direction of the z-axis is controlled by the pressure value sensed by the first z-axis signal collector 41, and the displacement variation of the controlled object in the interface space of the terminal equipment along the negative direction of the z-axis is controlled by the pressure value sensed by the second z-axis signal collector 42. The identifier is used to determine which one of signal collectors the pressure value is originated from. In the embodiment, the perpendicular direction of the controlled object in the space is the direction of the z-axis, the direction of the z-axis facing toward the upward side of the controlled object is the positive direction of the z-axis, and the other direction reverse to the positive direction of the z-axis is the negative positive of the z-axis.

The z-axis signal processor 43 comprises a computation module. The computation module extracts the pressure value $F_1$ and the identifier +1 as well as the pressure value $F_2$ and the identifier −1 from the received pressure signal respectively, and calculates the z-axis displacement variation value according to the pressure value $F_1$ and the pressure value $F_2$ as well as the formula (1).

$$\Delta z = \left(\frac{1}{2}\right) * F_1 * l_1 * T_1^2 - \left(\frac{1}{2}\right) * F_2 * l_2 * T_2^2 + V_1 * T_1 - V_2 * T_2 \quad (1)$$

Wherein $\Delta z$ is the z-axis displacement variation value for controlling the displacement variation of the controlled object in the interface space of the terminal equipment along the z-axis; if $\Delta z$ is positive, the controlled object moves towards the positive direction of the z-axis in the interface space; while if $\Delta z$ is negative, the controlled object moves towards the negative direction of the z-axis in the interface space.

$F_1$ is the pressure value detected by the first z-axis signal collector 41, corresponding to the displacement variation of the controlled object along the positive direction of the z-axis; and $F_2$ is the pressure value detected by the second z-axis signal collector 42, corresponding to the displacement variation of the controlled object along the negative direction of the z-axis.

$l_1$ represents a formula coefficient for a positive direction of the z-axis, $l_2$ represents a formula coefficient for a negative direction of the z-axis, and both $l_1$ and $l_2$ are set by the z-axis signal processor 43.

$V_1$ represents the moving velocity of the controlled object in the interface space along the positive direction of the z-axis, and $V_2$ represents the moving velocity of the controlled object in the interface space along the negative direction of the z-axis. In the embodiment, the moving velocity is calculated while assuming that $F_1$ and $F_2$ correspond to the moving accelerations along the positive direction and the negative direction of the z-axis respectively. The initial velocities of the $V_1$ and $V_2$ are defaulted as 0, and the velocity values of $V_1$ and $V_2$ are stored in the storage module of the z-axis signal processor 43. Moreover, after collecting the pressure value $F_1$ and the pressure value $F_2$ every time, the moving velocity at this time is calculated according to $V_1=V_1'+F_1*l_1*T_1$ and $V_2=V_2'+F_2*l_2*T_2$ and the stored velocity values are updated. $V_1'$ represents the previously-calculated moving velocity of the controlled object along the positive direction of the z-axis, and $V_2'$ represents the previously-calculated moving velocity of the controlled object along the negative direction of the z-axis.

$T_1$ represents the sampling period of the pressure signal for the positive direction of z-axis, $T_2$ represents the sampling period of the pressure signal for the negative direction of z-axis, and both $T_1$ and $T_2$ are set by the z-axis signal processor and can be the same.

The z-axis signal processor 43 transmits the calculated to the interface chip 1, the interface chip 1 transmits the received $\Delta z$ to the terminal equipment, and the terminal equipment controls the displacement variation of the controlled object along the direction of z-axis in the interface space according to $\Delta z$.

For instance, if the pressure value sensed by the first z-axis signal collector 41 is 5N, the pressure value sensed by the second z-axis signal collector 42 is 1N, which is equivalently converted into the acceleration value with a unit of m/s², the values of $l_1$ and $l_2$ are set as 1, the values of $T_1$ and $T_2$ are set as 0.1s, then $\Delta z$ can be calculated by the following equation.

$$\Delta Z = \left(\frac{1}{2}\right)*5*1*0.1^2 - \left(\frac{1}{2}\right)*1*1*0.1^2 + 10*0.1 - 0*0.1 = 1.02$$

Therefore, the z-axis displacement variation value is calculated as 1.02 m, so that the terminal equipment controls the controlled object in the interface space to move by a distance of 1.02 m along the positive direction of z-axis.

The first z-axis signal collector 41 and the second z-axis signal collector 42 can adopt a piezoresistive pressure sensor, an inductive pressure sensor, and a capacitive pressure sensor, and so on. The piezoresistive pressure sensor is preferably adopted in the embodiment.

In another embodiment, the computation module can further take the sensed pressure values $F_1$ and $F_2$ as the variables directly corresponding to the velocities, and $\Delta z$ is calculated according to formula (2).

$$\Delta z = F_1 * l_1 * T_1 - F_2 * l_2 * T_2 \qquad (2)$$

Wherein $l_1$ and $l_2$ are set according to the practical situation.

Compared to the $\Delta z$ calculated by the formula (1), as the moving velocity is calculated by taking the pressure values sensed by the first z-axis signal collector 41 and the second z-axis signal collector 42 as corresponding to the acceleration, the $\Delta z$ calculated by the formula (1) is able to reflect the effect of the force on the displacement variation more sensitively, that is to say, the effect of the variation of the forces $F_1$ and $F_2$ on the z-axis displacement variation value $\Delta z$ is more obvious.

Preferably, the storage module of the z-axis signal processor 43 is further stored with a pressure threshold $F_v$. The z-axis signal processor 43 further comprises a judgment module for judging whether the pressure value $F_1$ and the pressure value $F_2$ are not less than the pressure threshold $F_v$, respectively; and when the pressure value $F_1$ and the pressure value $F_2$ are judged not less than the pressure threshold $F_v$, the computation module of the z-axis signal processor 43 calculates the z-axis displacement variation value. When the judgment module judges that the pressure value $F_1$ and the pressure value $F_2$ are less than the pressure threshold $F_v$, the force is considered to be caused by misoperation. Therefore, the computation module does not calculate the z-axis displacement variation value, so as to avoid unnecessarily controlling the controlled object due to the misoperation.

A hand control input method of the hand control input device provided by the embodiment includes the following steps.

Step S11, the first z-axis signal collector 41 generates a pressure signal containing a pressure value of the force and an identifier of the first z-axis signal collector 41 according to the sensed force, and transmits the pressure signal to the z-axis signal processor 43.

The second z-axis signal collector 42 generates a pressure signal containing a pressure value of the force and an identifier of the second z-axis signal collector 42 according to the sensed force, and transmits the pressure signal to the z-axis signal processor 43.

Step S12, the z-axis signal processor 43 extracts various pressure values and identifiers from the received pressure signals, calculates the z-axis displacement variation value according to the various pressure values and the sampling period, and transmits the z-axis displacement variation value to the interface chip 1.

Step S13, the interface chip 1 transmits the received z-axis displacement variation value to the terminal equipment, and the terminal equipment controls the controlled object in the interface space of the terminal equipment to move along the direction of the z-axis according to the z-axis displacement variation value.

Second Embodiment

Figure 2:
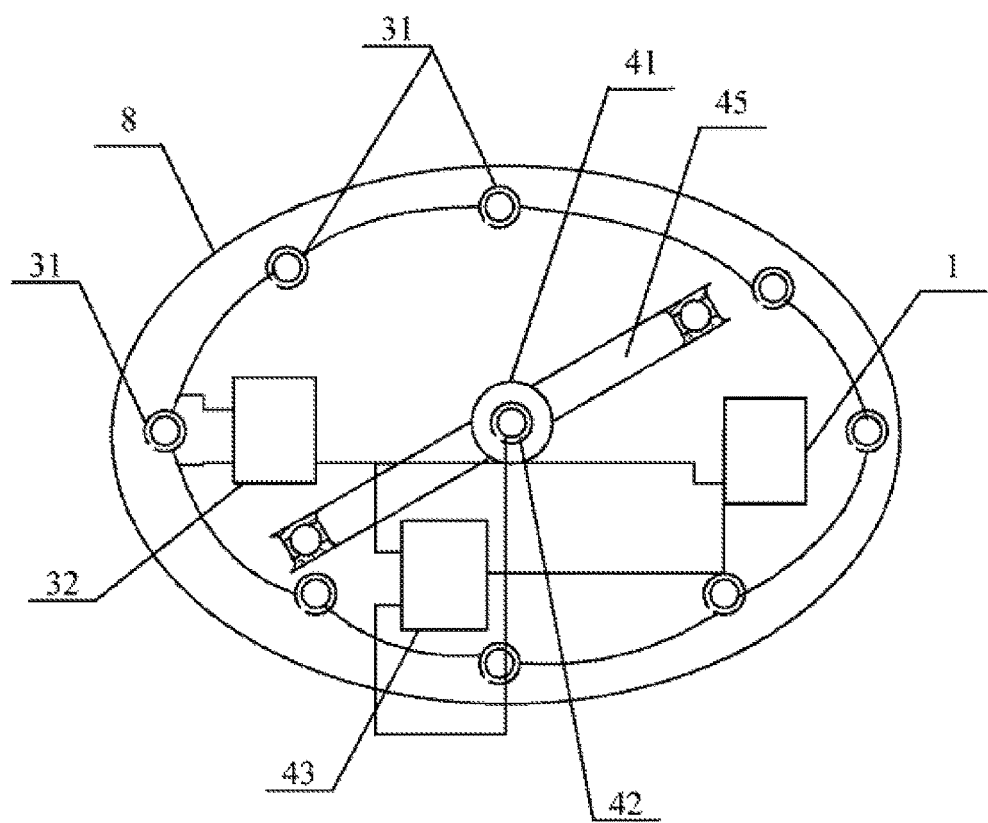
FIG. 2 is a structural diagram of a hand control input device provided by a second embodiment of the present disclosure.

As shown in FIG. 2, in addition to the components described in the first embodiment, the hand control input device of the second embodiment further comprises a rotation signal processor 2 and one or more rotation signal collectors 31. There are 8 rotation signal collectors 31 preferred in the embodiment. Of course, there may also be more or less than 8 rotation signal collectors.

Wherein, the eight rotation signal collectors 31 are arranged on the inner surface of a plane of the housing 8 parallel to the bottom surface of the housing 8, preferably, the eight rotation signal collectors 31 are arranged on the plane while being spaced at an equal angle. Each of the rotation signal collectors 31 is electrically connected with the rotation signal processor 2, and the rotation signal processor 2 is electrically connected with the interface chip 1.

As the positions of various rotation signal collectors 31 are all fixed in the housing 8, each rotation signal collector 31 has a directional value. The directional value is served as the angle value in the pressure signal. For instance, the angle value of some rotation signal collector 31 is defined as 0°, and then the angle values of various adjacent rotation signal collectors 31 are 45°, 90°, 135°, . . . 270° and 315° in a clockwise direction in sequence respectively.

The rotation signal collector 31 is used for sensing the pressure operating the hand control input device and converting the mechanical energy applied to the housing 8 into the pressure value, and then generating a pressure signal containing the pressure information and various angle values of various rotation signal collectors 31, and transmitting the pressure signal to the rotation signal processor 2. The rotation signal processor 2 extracts the maximum pressure value and the corresponding angle value from the received pressure signal(s), and transmits the extracted pressure value and the angle value to the interface chip 1. The interface chip 1 transmits the received pressure value and angle value to the terminal equipment. For instance, if the pressure value fed back by the rotation signal collector 31 at the angle value of 0° is a maximum value, which is 5N, the information extracted by the rotation signal processor 2 is that the pressure value is 5N and the angle value is 0°.

The rotation signal collector 31 of the embodiment is preferably a pressure sensor.

For instance, when the controlled object is a 3D controlled object, the terminal equipment determines the rotation direction of the controlled object according to the angle value, determines the rotation velocity of the controlled object according to the pressure value, and can determine the magnitude of the rotation angular velocity according to the continuous pressure time=ω×T (ω is the angular velocity value, and T is the sampling period of the rotation signal collector 31 and is a fixed parameter.) For example, the angle value of the rotation signal collector 31 with the maximum pressure value is 45°, the controlled object in the interface space of the terminal equipment rotates towards the direction at 45°. If the pressure value is 5N, the angular velocity of the controlled object rotated downward at the 45° can be set as 5°/s. The longer the time pressed by the user is the more the rotation amplitude of the controlled object becomes. The hand control input device of the embodiment controls the 3D controlled object conveniently and conforms to the human's sense habits. Of course, the hand control input device can also be used for controlling the two-dimensional controlled object. At this time, the pressure sensor pressed most decides the horizontal moving direction of the controlled object, the magnitude of the pressure decides the horizontal moving velocity of the controlled object, and the length of the continuous pressure time decides the horizontal moving distance.

A hand control input method of the hand control input device provided by the embodiment includes the following steps.

Step S21, various rotation signal collectors 31 generate the pressure signal according to the sensed force, and transmit the pressure signal containing the pressure value of the force and the corresponding angle value to the rotation signal processor 2.

Step S22, the rotation signal processor 2 selects the pressure signal corresponding to the maximum pressure value from the received pressure signal(s), extracts the pressure value and the angle value of the selected pressure signal and transmits the same to the interface chip 1.

Step S23, the interface chip 1 transmits the received pressure value and angle value to the terminal equipment, the pressure value is used for controlling the rotation velocity of the controlled object in the interface space of the terminal equipment, and the angle value is used for controlling the rotation direction of the controlled object.

Third Embodiment

Figure 3:
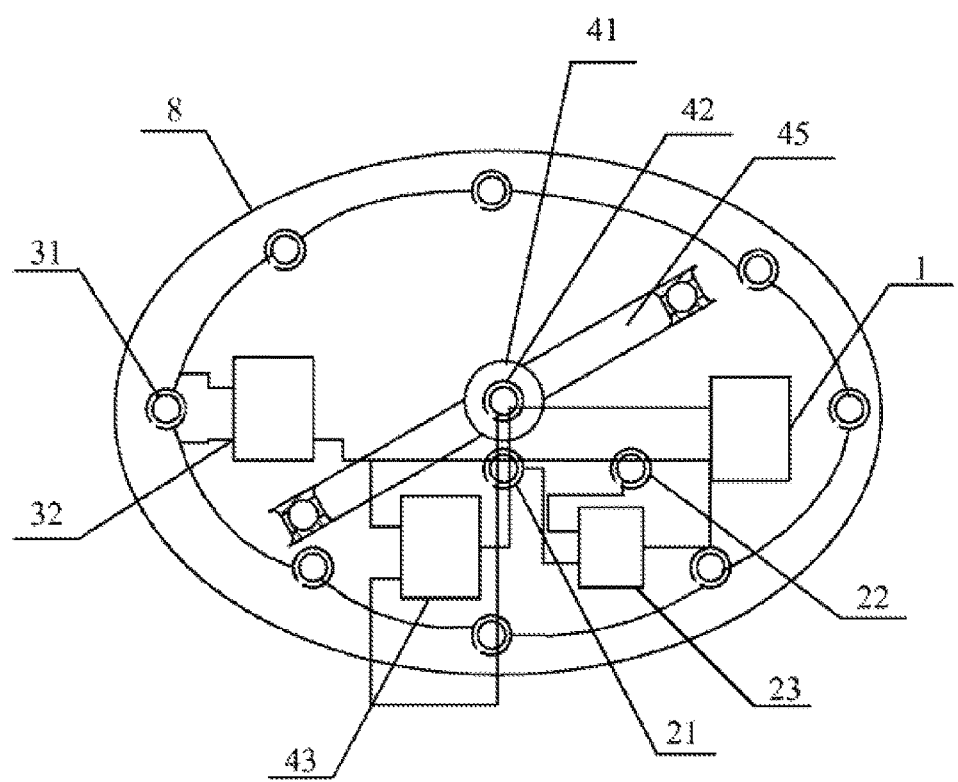
FIG. 3 is a structural diagram of a hand control input device provided by a third embodiment of the present disclosure.

As shown in FIG. 3, in addition to the components described in the second embodiment, the hand control input device of the third embodiment further comprises a primary track device 21, an auxiliary track device 22, and a track signal processor 23. The primary track device 21 and the auxiliary track device 22 are electrically connected with the track signal processor 23 respectively, and the track signal processor 23 is electrically connected with the interface chip 1. Both the primary track device 21 and the auxiliary track device 22 are fixedly arranged in the housing 8. Preferably, both the primary track device 21 and the auxiliary track device 22 are located on the same horizontal plane parallel to the bottom surface of the hand control input device or the same vertical plane perpendicular to the hand control input device.

The object of adding the foregoing parts in the embodiment is to improve the two-dimensional control performance of the hand control input device.

Figure 4:
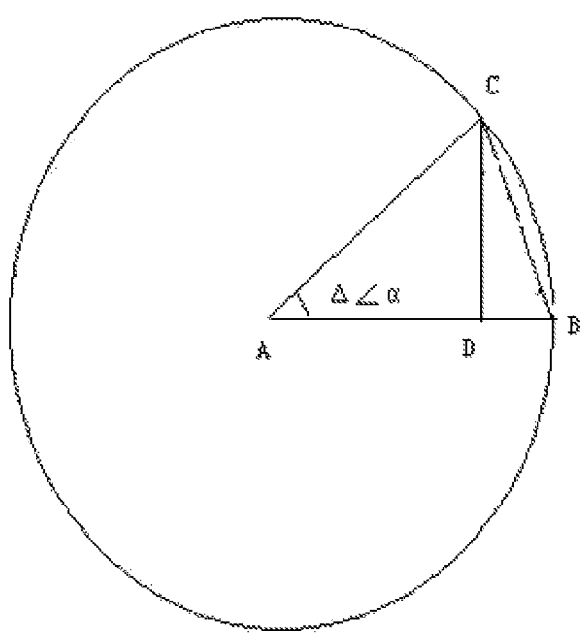
FIG. 4 is a schematic diagram for the calculation of the third embodiment of the present disclosure.

Both the primary track device 21 and the auxiliary track device 22 can collect their own displacement information. The displacement information contains a displacement value Δxa along the X direction of the moving plane of the primary track device 21 and the displacement value Δya along the Y direction of the moving plane. The displacement values (Δxa, Δya) of the primary track device 21 are served as the displacement signal of the hand control input device to transmit to the track signal processor 23. In order to be able to reflect the rotation operation of the hand control input device, the auxiliary track device 22 is further needed to collect its own displacement information. The rotation angle information (the rotation angle is to take the point of the primary track device 21 as the rotation center) of the hand control input device is obtained by comparing the displacement information of the auxiliary track device 22 with the displacement information of the primary track device 21. Preferably, the primary track device 21 is located in the center of some horizontal plane or the vertical plane of the housing 8. Assuming that the displacement information of the auxiliary track device 22 is (Δxb, Δyb), then the rotation angle would be $\Delta\angle\alpha=2 \text{ Arc sin}(\sqrt{((\Delta x_b-\Delta x_a)^2+(\Delta y_b-\Delta y_a)^2)}/2R)$. Wherein R is the distance between the primary track device 21 and the auxiliary track device 22. The computation principle can refer to FIG. 4, wherein A point is the position of the primary track device 21 after movement (to illustrate conveniently, it is assumed here that the primary track device 21 has no two-dimensional displacement and positioned at the A point after and before movement), B point is the position of the auxiliary track device 22 before movement, and C point is the position of the auxiliary track device 22 after movement. The vertex angle of an isosceles triangle is the angle variation value needed to be solved. $BC=\sqrt{((\Delta x_b-\Delta x_a)^2+(\Delta y_b-\Delta y_a)^2)}$ can be calculated according to $CD=\Delta y_b-\Delta y_a$ and $BD=\Delta x_b-\Delta x_a$. The lengths of the three sides of the isosceles triangle are obtained according to a trigonometric function formula, which can obtain:

$$\Delta\angle\alpha=2 \text{ Arc sin}(\sqrt{((\Delta x_b-\Delta x_a)^2+(\Delta y_b-\Delta y_a)^2)}/2R) \quad (3)$$

In conclusion, the displacement signal and the rotation angle signal of the hand control input device can be obtained by collecting the displacement information of the primary track device 21 and the auxiliary track device 22. The two signal values are transmitted to the interface chip 1 via the track signal processor 23, so as to realize the rotation and displacement operation of the 2D controlled object, realizing the two-dimensional control function.

The primary track device 21 and the auxiliary track device 22 can be an infrared transmitter, a laser transmitter, a ball grating positioner, and so on.

Compared with the method in the foregoing first embodiment, the hand control input method of the hand control input device of the embodiment further includes the following steps:

Step S31, the primary track device 21 detects the coordinate variation quantity within one sampling time period and generates the displacement signal of the primary track device 21. The displacement signal includes the displacement values (Δxa, Δya) and the identifier of the primary track device 21, and then the primary track device 21 transmits the displacement signal of the primary track device 21 to the track signal processor 23.

The auxiliary track device 22 detects the coordinate variation quantity within one sampling time period and generates the displacement signal of the auxiliary track device 22. The displacement signal of the auxiliary track device 22 includes the displacement values (Δxb, Δyb) and the identifier of the auxiliary track device 22, and then the auxiliary track device 22 transmits the displacement signal of the auxiliary track device 22 to the track signal processor 23.

Step S32, the track signal processor 23 calculates the rotation angle value of the hand control input device according to the received track signal and the formula $\Delta\angle\alpha = 2 \operatorname{Arc} \sin(\sqrt{((\Delta x_b - \Delta x_a)^2 + (\Delta y_b - \Delta y_a)^2)}/2R)$. The displacement value of the primary track device 21 is served as the displacement value of the hand control input device, and then the identifier corresponding to the displacement variation value is stored.

Step S33, the track signal processor 23 transmits the calculated rotation angle value and displacement value to the terminal equipment via the interface chip 1. The displacement value is used for controlling the moving distance of the controlled object along the X axis and the Y axis in the interface space, and the rotation angle value is used for controlling the rotation angle of the controlled object in the interface space.

Fourth Embodiment

The difference between the fourth embodiment and the third embodiment is that the auxiliary track device 22 is replaced as the angle detector for collecting the rotation angle value of the hand control input device.

The angle detector includes a rotation shaft fixed in the housing 8 and a flat spring pointer embedded on the rotation shaft. When the housing 8 does not rotate, the rotation shaft does not rotate either, the flat spring pointer is located in the initial position, the angle is 0, and the elastic force value is 0. When the housing 8 rotates, the rotation shaft rotates together with the housing 8; while the flat spring pointer remains unmoved, so that a certain angle is generated between the flat spring pointer and the rotation shaft to generate the elastic force value. The direction of the elastic force can be stipulated, for instance, the direction of the elastic force generated by the flat spring pointer is stipulated as the positive direction when the rotation shaft rotates clockwise, and direction of the elastic force generated by the flat spring pointer is stipulated as the negative direction when the rotation shaft rotates counterclockwise. The track signal processor 23 measures the time duration of a certain time period and the elastic force value of the flat spring pointer in the time period. The elastic value is converted as the angular velocity ω (unit: rad/s), and then the angle change rate and the time value are subject to the integral operation to obtain the rotation angle value Δ<β within the time period. The formula is as follow:

$$\Delta\angle\beta = \int_0^t \omega dt \tag{4}$$

Then, the track signal processor 23 transmits the rotation angle value to the interface chip 1, and the interface chip 1 transmits the received rotation angle signal and the displacement signal transmitted by the primary track device 21 to the terminal equipment.

In fact, the angle detector can have various deformations, as long as it can detect the rotation angle value of the hand control input device during the movement.

The hand control input device of the embodiment, same as that of the second embodiment, can be used for controlling the operation of a 2D controlled object, such as directional control and translation operation.

Fifth Embodiment

Figure 5:
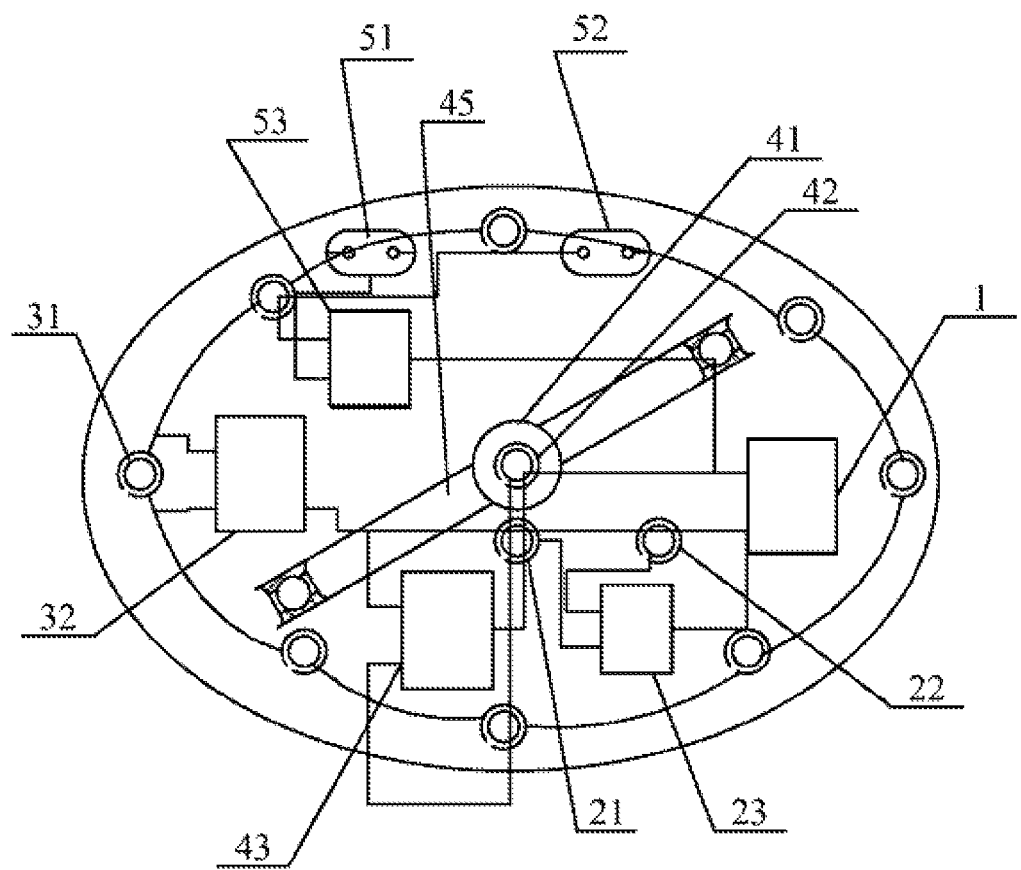
FIG. 5 is a structural diagram of a hand control input device provided by a fifth embodiment of the present disclosure.

As shown in FIG. 5, in addition to the components described in the third embodiment, the hand control input device of the fifth embodiment further comprises a left touch pressure signal collector 51, a right touch pressure signal collector 52, and a touch pressure signal processor 53. The left touch pressure signal collector 51 and the right touch pressure signal collector 52 are electrically connected to the touch pressure signal processor 53 respectively, and the touch pressure signal processor 53 is electrically connected to the interface chip 1.

In fact, there may be one or more touch pressure signal collectors arranged.

With sensing the externally applied force, the left touch pressure signal collector 51 and the right touch pressure signal collector 52 each generate the touch pressure signal containing the touch pressure information. The touch pressure signal includes a pressure value and an identifier of the touch pressure signal collector. The left touch pressure signal collector 51 and the right touch pressure signal collector 52 transmit the generated touch pressure signal to the touch pressure signal processor 53 respectively. The touch pressure signal processor 53 extracts the touch pressure information from the received touch pressure signals, and combines the information as an information set including two sets of touch pressure information. The information set is transmitted to the interface chip 1, and the interface chip 1 transmits the received information set to the terminal equipment. When only one touch pressure signal collector is set, the touch pressure signal processor 53 only transfers the received touch pressure signal to the interface chip 1.

In the embodiment, the touch pressure information is used for instructing the program in the terminal equipment to execute the corresponding action. For instance, when a play button of a player on the interface of the terminal equipment is controlled by the left touch pressure signal collector 51, the magnitude of the pressure value is corresponding to the playing speed, and the pressure of the N consecutive sampling periods is corresponding to popping up the next level of menu, etc. The identifier is used for indicating which one of the touch pressure signal collectors the signal is originated from, so as to avoid mixing with the signal transmitted by another pressure sensor.

The touch pressure signal collector may be a piezoresistive pressure sensor, an inductive pressure sensor, a capacitive pressure sensor, a resonant pressure sensor, a resistance strain gauge type pressure sensor, a semiconductor strain gauge type pressure sensor, a capacitive acceleration sensor, and a micro switch, etc. Preferably, the piezoresistive pressure sensor is used as the touch pressure signal collector in the embodiment, as it has low price, higher precision and better linear performance.

The part of the housing 8 corresponding to the touch pressure signal collector is configured to be movable, and can be pressed down to contact the touch pressure signal collector to generate the touch pressure signal.

Compared with the method in the foregoing second embodiment, the hand control input method of the hand control input device of the embodiment further includes the following steps:

Step S41, various touch pressure signal collectors senses the force to generate the touch pressure signal containing the touch pressure information and transmit the touch pressure signal to the touch pressure signal processor 53. The touch pressure information includes the pressure value of the force and the identifier of the left touch pressure signal collector.

Step S42, the touch pressure signal processor 53 transmits the touch pressure signal to the terminal equipment via the interface chip 1.

Sixth Embodiment

The difference between the embodiment and the first embodiment is that the left touch pressure signal collector 51, the right touch pressure signal collector 52, and the touch pressure signal processor 53 are added. The left touch pressure signal collector 51 and the right touch pressure signal collector 52 are electrically connected to the touch pressure signal processor 53 respectively, and the touch pressure signal processor 53 is electrically connected to the interface chip 1.

As the functions and principles of the added part are the same as those of the fifth embodiment, they will not be elaborated in details herein.

Seventh Embodiment

The difference between the embodiment and the second embodiment is that the left touch pressure signal collector 51, the right touch pressure signal collector 52, and the touch pressure signal processor 53 are added. The left touch pressure signal collector 51 and the right touch pressure signal collector 52 are electrically connected to the touch pressure signal processor 53 respectively, and the touch pressure signal processor 53 is electrically connected to the interface chip 1.

As the functions and principles of the added part are the same as those of the fifth embodiment, they will not be elaborated in details herein.

Eighth Embodiment

The difference between the embodiment and the third embodiment is that the left touch pressure signal collector 51, the right touch pressure signal collector 52, and the touch pressure signal processor 53 are added. The left touch pressure signal collector 51 and the right touch pressure signal collector 52 are electrically connected to the touch pressure signal processor 53 respectively, and the touch pressure signal processor 53 is electrically connected to the interface chip 1.

As the functions and principles of the added part are the same as those of the fifth embodiment, they will not be elaborated in details herein.

The hand control input device provided by the embodiment can replace the mouse to be used in the terminal equipment such as the computer. The user can press the hand control input device so as to realize the operation of the controlled object in the interface space of the computer. The hand control input device of the disclosure can not only realize the traditional two-dimensional control function, but also can realize the three-dimensional control of the controlled object. Particularly, for the 3D controlled object, the control for the 3D controlled object along the direction of the z-axis in the interface space can be realized so as to realize all-around control of two dimensions and three dimensions on the controlled object.

Those having ordinary skills in the art may understand that all or part of flows of the foregoing embodiments may be finished by the hardware related to the computer program instruction. The foregoing program may be stored in a computer-readable storage medium. The program may include the flows of the foregoing various embodiments during execution. Wherein, the foregoing storage medium may be a disk, an optical disk, a READ-Only Memory (ROM) or a Random Access Memory (RAM), etc.

The above description is merely detailed implementation manner of the present disclosure, but not intended to limit the protection scope of the present disclosure. Any changes or replacements easily figured out by those skilled in the art without departing from the technical scope disclosed by the present disclosure shall all fall within the protection scope of the present disclosure. Therefore, the protection scope of the present disclosure shall be subjected to the protection scope of the claims.

PRACTICAL APPLICABILITY

The control input equipment provided according to the embodiments of the present disclosure can be applied in the field of the computer peripherals, which can not only realize the traditional two-dimensional control function, but also can be particularly suitable for the 3D game and 3D model building operation, and can realize the three-dimensional control of the controlled part. For the 3D controlled object, the control for the 3D controlled object along the direction of the z-axis in the interface space can be realized so as to realize all-around control of two dimensions and three dimensions on the controlled object.

What is claimed is:
1. A hand control input device, comprising:
a housing, and
an interface chip arranged inside the housing for communicating with a terminal equipment,
wherein the hand control input device further comprises:
a first z-axis signal collector arranged inside the housing for sensing a first force and generating a first z-axis signal, the first z-axis signal containing a first pressure value indicating a magnitude of the first force and a first identifier identifying the first z-axis signal collector;
a second z-axis signal collector arranged inside the housing for sensing a second force and generating a second z-axis signal, the second z-axis signal containing a second pressure value indicating a magnitude of the second force and a second identifier identifying the second z-axis signal collector; and
a z-axis signal processor, arranged inside the housing and connected with the first z-axis signal collector, the second z-axis signal collector, and the interface chip, the z-axis signal processor being adapted to extract the first pressure value from the received first z-axis signal, extract the second pressure value from the received second z-axis signal, calculate, according to the first pressure value, the second pressure value, and a sampling period, a z-axis displacement variation value for controlling a displacement variation of a controlled object in an interface space of the terminal equipment in a direction of z-axis, and transmit the z-axis displacement variation value to the terminal equipment via the interface chip, and the direction of the z-axis is a perpendicular direction of the controlled object in the interface space, wherein the z-axis signal processor comprises a computation module for calculating the z-axis displacement variation value by the following formula, $$\Delta z = \left(\frac{1}{2}\right) * F_1 * l_1 * T_1^2 - \left(\frac{1}{2}\right) * F_2 * l_2 * T_2^2 + V_1 * T_1 - V_2 * T_2$$

wherein, $\Delta z$ represents the z-axis displacement variation value, $F_1$ represents the first pressure value, $F_2$ represents the second pressure value, $l_1$ represents a formula coefficient for a positive direction of the z-axis, $l_2$ represents a formula coefficient for a negative direction of the z axis, $V_1$ represents a moving velocity of the controlled object in the interface space of the terminal equipment along the positive direction of the z-axis, $V_2$ represents a moving velocity of the controlled object along the negative direction of the z-axis, and $V_1 = V_1' + F_1 * l_1 * T_1$ and $V_2 = V_2' + F_2 * l_2 * T_2$, $V_1'$ represents the previously-calculated moving velocity of the controlled object along the positive direction of the z-axis, $V_2'$ represents the previously-calculated moving velocity of the controlled object along the negative direction of the z-axis, $T_1$ represents the sampling period of the first z-axis signal, represents the sampling period of the second z-axis signal, and both $T_1$ and $T_2$ are set by the z-axis signal processor.

2. The hand control input device according to claim 1, wherein the z-axis signal processor further comprises a storage module for storing the moving velocity of the controlled object along the positive direction of the z-axis and the moving velocity of the controlled object along the negative direction of the z-axis calculated every time.

3. The hand control input device according to claim 2, wherein the storage module is further stored with a pressure threshold $F_\psi$, the z-axis signal processor further comprises a judgment module for judging whether the first pressure value $F_1$ and the second pressure $F_2$ are not less than the pressure threshold $F_\psi$ respectively, and the computation module calculates the z-axis displacement variation value in a case where the judgment module judges that the first pressure value $F_1$ and the second pressure value $F_2$ are not less than the pressure threshold $F_\psi$.

4. The hand control input device according to claim 1, wherein the first z-axis signal collector is arranged inside the housing via a connecting rod, and senses the first force applied to both ends or one end of the connecting rod, and the first force is corresponding to a displacement of the controlled object along a positive direction of the z-axis in the interface space.

5. The hand control input device according to claim 1, wherein the second z-axis signal collector is arranged on a top inside the housing, and senses the second force applied to the top of the housing, and the second force is corresponding to a displacement of the controlled object along a negative direction of the z-axis in the interface space.

6. The hand control input device according to any one of claim 1, 2, 3, 4, or 5, wherein the housing is further internally provided with:

one or more rotation signal collectors for respectively sensing a third force and generating a rotation signal, the rotation signal containing a third pressure value indicating a magnitude of the third force and an angle value indicating a position of the rotation signal collector in the hand control input device; and a rotation signal processor, electrically connected with each rotation signal collector and the interface chip, the rotation signal processor being adapted to extract the third pressure value and the angle value from each rotation signal, and transmit the third pressure value and the angle value to the terminal equipment via the interface chip.

7. The hand control input device according to any one of claim 1, 2, 4, or 5, wherein the housing is further internally provided with:

a primary track device for detecting a displacement value of the hand control input device, and transmitting a displacement signal containing the displacement value;

an angle detector for detecting a rotation angle value of the hand control input device, and transmitting an angle signal containing the rotation angle value; and a track signal processor, electrically connected with the primary track device, the angle detector, and the interface chip, the track signal processor being adapted to extract the displacement value from the received displacement signal, extract the rotation angle value from the received angle signal, and transmit the displacement value and the rotation angle value to the terminal equipment via the interface chip, the displacement value and the rotation angle value are used to control a translation and rotation of the controlled object in the interface space of the terminal equipment respectively.

8. The hand control input device according to any one of claim 1, 4, or 5, wherein the housing is further internally provided with:

a primary track device for collecting its own displacement value as a displacement value of the hand control input device, and transmitting a displacement signal containing the displacement value; and an auxiliary track device for collecting its own displacement value, and calculating a rotation angle value of the hand control input device according to its own displacement and the displacement value of the primary track device, the displacement value of the hand control input device and the rotation angle value of the hand control input device are used to control a translation and rotation of the controlled object in the interface space of the terminal equipment respectively.

9. The hand control input device according to any one of claim 1, 2, 4, or 5, wherein the housing is further internally provided with:

a touch pressure signal collector for sensing a fourth force and generating a touch pressure signal, the touch pressure signal containing a fourth pressure value indicating a magnitude of the fourth force and a fourth identifier identifying the touch pressure signal collector; and a touch pressure signal processor, electrically connected with the touch pressure signal collector and the interface chip, the touch pressure signal processor being adapted to extract the fourth pressure value and the fourth identifier from the received touch pressure signal, and transmit the fourth pressure value and the fourth identifier to the terminal equipment via the interface chip.

10. A hand control input device, comprising:
a housing, and
an interface chip arranged inside the housing for communicating with a terminal equipment,
wherein the hand control input device further comprises:
a first z-axis signal collector arranged inside the housing for sensing a first force and generating a first z-axis signal, the first z-axis signal containing a first pressure value indicating a magnitude of the first force and a first identifier identifying the first z-axis signal collector;
a second z-axis signal collector arranged inside the housing for sensing a second force and generating a second z-axis signal, the second z-axis signal containing a second pressure value indicating a magnitude of the second force and a second identifier identifying the second z-axis signal collector; and
a z-axis signal processor, arranged inside the housing and connected with the first z-axis signal collector, the second z-axis signal collector, and the interface chip, the z-axis signal processor being adapted to extract the first pressure value from the received first z-axis signal, extract the second pressure value from the received second z-axis signal, calculate, according to the first pressure value, the second pressure value, and a sampling period, a z-axis displacement variation value for controlling a displacement variation of a controlled object in an interface space of the terminal equipment in a direction of z-axis, and transmit the z-axis displacement variation value to the terminal equipment via the interface chip, and
the direction of the z-axis is a perpendicular direction of the controlled object in the interface space,
wherein the housing is further internally provided with:
a primary track device for collecting its own displacement value as a displacement value of the hand control input device, and transmitting a displacement signal containing the displacement value; and
an auxiliary track device for collecting its own displacement value, and calculating a rotation angle value of the hand control input device according to its own displacement and the displacement value of the primary track device,
the displacement value of the hand control input device and the rotation angle value of the hand control input device are used to control a translation and rotation of the controlled object in the interface space of the terminal equipment respectively; and
wherein the auxiliary track device calculates the rotation angle value by the following formula:

$$\Delta\angle\alpha = 2 \text{ Arc } \sin(\sqrt{((\Delta x_b - \Delta x_a)^2 + (\Delta y_b - \Delta y_a)^2)}/2R)$$

wherein, $\Delta\angle\alpha$ represents the rotation angle value, $\Delta x_a$ and $\Delta y_a$ represent the displacement values of the primary track device on a X-axis and Y-axis of its moving plane respectively, $\Delta x_b$ and $\Delta y_b$ represent the displacement values of the auxiliary track device on a X-axis and Y-axis of its moving plane respectively, and R represents a distance between the primary track device and the auxiliary track device.

11. The hand control input device according to claim 10, wherein the z-axis signal processor comprises a computation module for calculating the z-axis displacement variation value by the following formula, $$\Delta z = F_1 * l_1 * T_1 - F_2 * l_2 * T_2$$

wherein, $\Delta z$ represents the z-axis displacement variation value, $F_1$ represents the first pressure value, $F_2$ represents the second pressure value, $l_1$ represents a formula coefficient for a positive direction of the z-axis, $l_2$ represents a formula coefficient for a negative direction of the z-axis, $T_1$ represents the sampling period of the first z-axis signal, $T_2$ represents the sampling period of the second z-axis signal, and both $T_1$ and $T_2$ are set by the z-axis signal processor.

12. The hand control input device according to claim 10, wherein the z-axis signal processor comprises a computation module for calculating the z-axis displacement variation value by the following formula, $$\Delta z = \left(\frac{1}{2}\right) * F_1 * l_1 * T_1^2 - \left(\frac{1}{2}\right) * F_2 * l_2 * T_2^2 + V_1 + T_1 - V_2 * T_2$$

wherein, $\Delta z$ represents the z-axis displacement variation value, $F_1$ represents the first pressure value, $F_2$ represents the second pressure value, $l_1$ represents a formula coefficient for a positive direction of the z-axis, $l_2$ represents a formula coefficient for a negative direction of the z-axis, $V_1$ represents a moving velocity of the controlled object in the interface space of the terminal equipment along the positive direction of the z-axis, $V_2$ represents a moving velocity of the controlled object along the negative direction of the z-axis, and $V_1 = V_1' + F_1 * l_1 * T_1$ and $V_2 = V_2' + F_2 * l_2 * T_2$, $V_1'$ represents the previously-calculated moving velocity of the controlled object along the positive direction of the z-axis, $V_2'$ represents the previously-calculated moving velocity of the controlled object along the negative direction of the z-axis, $T_1$ represents the sampling period of the first z-axis signal, $T_2$ represents the sampling period of the second z-axis signal, and both $T_1$ and $T_2$ are set by the z-axis signal processor.

13. The hand control input device according to claim 12, wherein the z-axis signal processor further comprises a storage module for storing the moving velocity of the controlled object along the positive direction of the z-axis and the moving velocity of the controlled object along the negative direction of the z-axis calculated every time.

14. The hand control input device according to claim 10, wherein the first z-axis signal collector is arranged inside the housing via a connecting rod, and senses the first force applied to both ends or one end of the connecting rod, and the first force is corresponding to a displacement of the controlled object along a positive direction of the z-axis in the interface space.

15. The hand control input device according to claim 10, wherein the second z-axis signal collector is arranged on a top inside the housing, and senses the second force applied to the top of the housing, and the second force is corresponding to a displacement of the controlled object along a negative direction of the z-axis in the interface space.

16. The hand control input device according to any one of claim 10, 11, 12, 14, or 15, wherein the housing is further internally provided with:
one or more rotation signal collectors for respectively sensing a third force and generating a rotation signal, the rotation signal containing a third pressure value indicating a magnitude of the third force and an angle value indicating a position of the rotation signal collector in the hand control input device; and a rotation signal processor, electrically connected with each rotation signal collector and the interface chip, the rotation signal processor being adapted to extract the third pressure value and the angle value from each rotation signal, and transmit the third pressure value and the angle value to the terminal equipment via the interface chip.

17. The hand control input device according to any one of claim 10, 11, 12, 14, or 15, wherein the housing is further internally provided with:
a primary track device for detecting a displacement value of the hand control input device, and transmitting a displacement signal containing the displacement value;
an angle detector for detecting a rotation angle value of the hand control input device, and transmitting an angle signal containing the rotation angle value; and
a track signal processor, electrically connected with the primary track device, the angle detector, and the interface chip, the track signal processor being adapted to extract the displacement value from the received displacement signal, extract the rotation angle value from the received angle signal, and transmit the displacement value and the rotation angle value to the terminal equipment via the interface chip, wherein the displacement value and the rotation angle value are used to control a translation and rotation of the controlled object in the interface space of the terminal equipment respectively.

18. The hand control input device according to any one of claim 10, 11, 12, 14, or 15, wherein the housing is further internally provided with:
a touch pressure signal collector for sensing a fourth force and generating a touch pressure signal, the touch pressure signal containing a fourth pressure value indicating a magnitude of the fourth force and a fourth identifier identifying the touch pressure signal collector; and
a touch pressure signal processor, electrically connected with the touch pressure signal collector and the interface chip, the touch pressure signal processor being adapted to extract the fourth pressure value and the fourth identifier from the received touch pressure signal, and transmit the fourth pressure value and the fourth identifier to the terminal equipment via the interface chip.

\* \* \* \* \*